Figure 1:
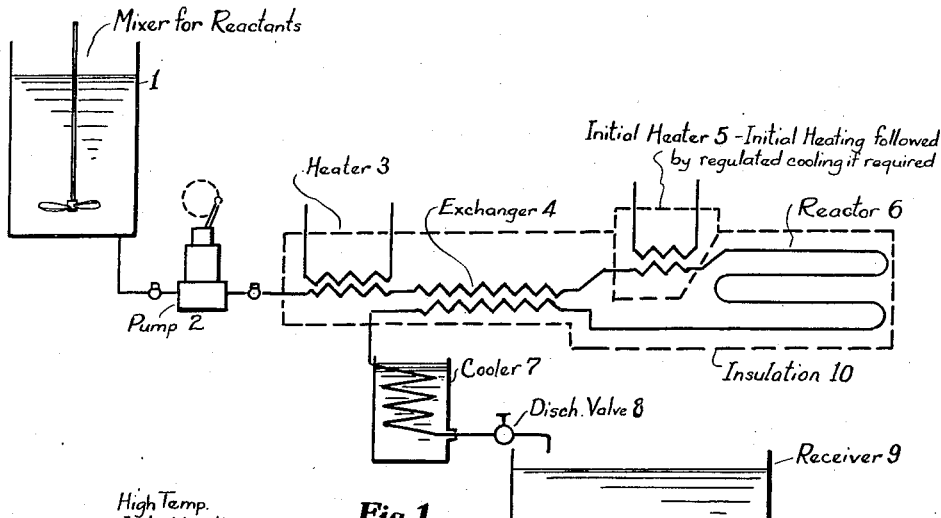

Aug. 8, 1933.          M. E. PUTNAM          1,921,373

METHOD OF CONDUCTING CHEMICAL REACTIONS IN LIQUID MEDIA

Filed Jan. 13, 1930

INVENTOR
Mark E. Putnam
BY Thomas Griswold Jr.
ATTORNEY

Patented Aug. 8, 1933

1,921,373

UNITED STATES PATENT OFFICE 1,921,373

METHOD OF CONDUCTING CHEMICAL REACTIONS IN LIQUID MEDIA

Mark E. Putnam, Midland, Mich., assignor to The Dow Chemical Company, Midland, Mich., a Corporation of Michigan Application January 13, 1930. Serial No. 420,399

6 Claims. (Cl. 260—154)

The present invention, relating as indicated to the conduct of chemical reactions in liquid media, has particular reference to the conduct of such reactions in a continuous manner, particularly where relatively high temperatures are required involving in some cases relatively high pressures and is concerned specifically with an improved method for the conduct and control of such reactions.

Griswold has disclosed in U. S. Patent 1,602,766 a method and means for conducting reactions of the character described under pressure at high temperature in a continuous tubular reaction vessel. I have operated such a system for carrying out the hydrolytic type of reaction, specifically that for the formation of sodium phenate by reaction of monochlorobenzene and an aqueous solution of caustic soda. In the method and apparatus employed, the immiscible reaction ingredients are mixed under atmospheric pressure and at room temperature, the mixture is then pumped in a continuous stream under pressure, controlled by a weighted discharge valve on the end of the pressure system, through a pipe coil heater set in a fuel fired furnace, thence through a pipe coil surrounded by a heat insulating jacket, and thence through a cooling coil to the discharge valve heretofore mentioned.

Although the above described method has been found commercially practicable and advantageous, certain difficulties are encountered which it is the object of the present invention to remove or overcome in large degree.

Owing to the requirement for high pressure, e. g. in excess of 3000 pounds gauge, and temperature, in this instance, in the neighborhood of 350° C., it is evident that the use of small diameter, thick walled tubing is indicated. Because of the time factor required for the reaction, which time factor will vary with temperature, and the character of the ingredients reacted, a certain cubic capacity is required in the reactor coil to insure the progress of the reaction to a satisfactory degree of completion therein before discharge. Practically, in large scale production, several thousand feet of tubing are required in a unit setting, the preparation of which in compact form and its installation calls for a high degree of technical skill and engineering. It is highly desirable that such a construction should have a long life. When operating for the production of phenol, as above described, internal corrosion occurs in the heating coil, the iron apparently going into solution, and plugging of the cooling coil occurs by the precipitation therein of the iron taken up from the heating coil. Much money and effort has been expended in evolving and testing methods of control and arrangement of elements to minimize such corrosion and plugging, but with indifferent success. It has become apparent that corrosion is more active where the metal is more highly heated, so that overheating should be avoided. Such corrosion may be so localized as to cause rupture or puncture of the heating tube after a short period of use, i. e. even before eventual plugging of the cooler interrupts operations. Overheating cannot, however, be altogether avoided in a fuel fired furnace without lowering the heat head between the gaseous products of combustion and the pipe coil to such a degree that an abnormally long heating coil is required and even then the heat head must be considerable, thereby leaving open the possibility of local overheating. The cost of shutdowns, involving dismantling, cutting out of defective sections and replacement, etc., involves capital, material and labor charges as well as loss of contents of the system, which inflict a considerable burden upon the operation. Heating by submergence in a fused metal or salt bath, such as suggested by Aylsworth U. S. 1,213,142, has been tested, but such practice introduces other factors as difficult of control and does not afford a satisfactory solution. Aside from the trouble with overheating, the control of temperature attained by the reacting mixture is difficult, when furnace heating is used. Variations in temperature from the optimum cause variations in yield and character of products formed. With the best results heretofore obtainable with large-sized equipment, not only is the duration of runs problematical, varying from a few hours to many days, but the temperature of the reacting mixture varies through an undesirably large range, causing varying yields and varying tar formation. Owing to the impracticability of stabilizing the temperature it has been necessary to employ more alkali in the mixture than would have been necessary if the temperature could have been held at a steady value, thus loading the process with a charge for excess alkali and for the acid to neutralize same subsequently in working up the product.

The cost of fuel for the heating operation, particularly if the temperature of the products of combustion be reduced by dilution thereof in an attempt to avoid overheating, constitutes a considerable item of expense.

It has become manifest that the stabilization of temperature, elimination of corrosion and plugging, and the reduction in fuel consumption are highly desirable improvements.

It is accordingly the object of the present invention to stabilize temperature, to eliminate or substantially reduce corrosion and plugging, to largely reduce or entirely eliminate fuel consumption, to improve yields, reduce after treatment costs and increase the output of product per unit of equipment.

To the accomplishment of the foregoing and related ends, the invention, then, consists of the method hereinafter fully described and particularly pointed out in the claims, the annexed drawings and the following description setting forth in detail several modes of carrying out the invention, such disclosed modes illustrating, however, but several of the various ways in which the principle of the invention may be used.

In said annexed drawing:—

Figure 2:
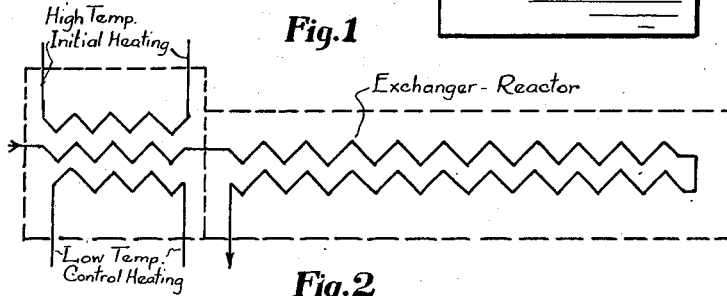
Figure 3:
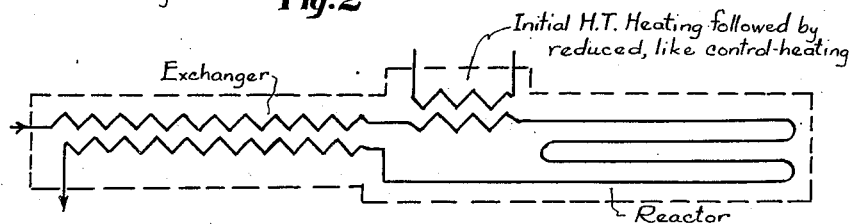
Figure 4:
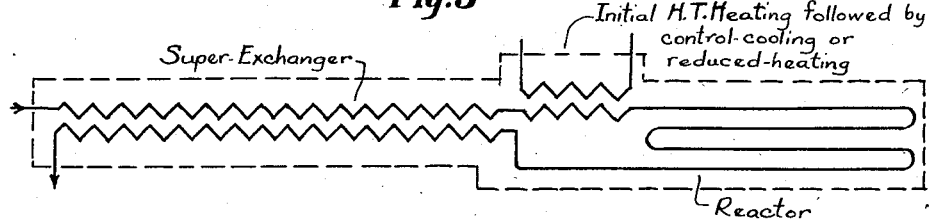

The several figures there appearing represent diagrammatically in Fig. 1 a preferred arrangement of connected apparatus for carrying out my invention; in Figs. 2 to 4, inclusive, in like diagrammatic manner, alternative arrangements.

In Fig. 1 of said drawing, 1 represents a mixing tank in which the ingredients to be reacted may be prepared in the form of a mixture through which the constituents thereof are preferably well dispersed. 2 is a pump suitable for operating continuously at the desired pressure, and above, and further adapted to force a continuous stream of the fluid mixture from tank 1 into and through apparatus which will now be described. 3 is a heater element utilizing preferably a low temperature heating agent in controlled manner, which element may conveniently take the form of a double pipe coil adapted to utilize steam at suitable pressure or other heating agent to heat the ingoing stream of fluid mixture sufficiently to enable control of the temperature in the reaction zone when the system has attained a working condition. 4 is a countercurrent heat exchanger which may also conveniently take the form of a double pipe coil adapted to bring the ingoing and outgoing streams of the mixture into heat transfer relation whereby the heat in the reacted fluid may be transferred to the incoming fluid stream. Following the exchanger 4 is a heating element or coil 5, preferably set in means adapted to supply heat at a proper head as from the combustion of fuel. Such heating will be used preferably in starting, only, for the purpose of bringing up initially the temperature of the liquid stream to a suitable reaction temperature after which the use thereof may be cut out, and reliance thereafter be rested entirely upon the heater 3 to maintain the system in thermal balance in opposition to the effect of variations in operating conditions. Following the heater 5 is the reactor or reaction coil 6 having a cubic capacity suited to the reaction in hand, whereby sufficient time is given therein for the reaction to proceed as desired. The coil or reactor 6 then discharges through the exchanger 4, thence to the cooler 7, if such be required, and from there through the discharge or relief valve 8 into the receiver 9, wherein the cooled reacted liquid products are collected. The entire tubular system, or equivalent elements 3, 4, 5 and 6, will preferably be encased in a heat insulating jacket 10, indicated in dashed lines, adapted to conserve heat effectively in the system. In addition, the casing or combustion chamber of the heater 5 will be provided with means for closing it against air circulation and loss of heat while not in use.

The exact details of construction are not essential to the present invention, but I have found it desirable, when employing a tubular system, to so relate the cross section of the tubing used to the volume of flow of liquid therethrough that so called "turbulent flow" occurs, by means of which turbulence a satisfactory persistence of the initial mixture is secured throughout the system. I have found it further convenient and desirable to arrange the connected units into a compact assembly, permitting thereby limitation of the area of insulating casing and heat radiating surface. I have found it further desirable to make up large coil units in sections of such size as to be readily handled in and out during construction or repairs.

Operating, for example, for the production of phenol by the hydrolysis of monochlorobenzene in aqueous caustic soda solution, I have used steel tubing with success. Here the range of temperature may desirably be pushed to 350° to 400° C., or even somewhat higher, in the reaction zone, depending upon the character of reaction products desired. I have found that after supplying for a short time initial heat by burning fuel in the heater 5 such heating may be entirely stopped and all further heat required may then be furnished by employing in the heater 3 steam at say 150 pounds gauge pressure, or above, and that the heat of reaction may be depended upon to maintain or even increase the temperature of the liquid in the reactor 6. Such action is more marked as the concentration of the caustic soda is raised. Employing a 12 percent NaOH solution and careful heat conservation some rise in temperature is noted in the reactor. With the higher strength of solution, such as 18 to 24 per cent with proportional increase in the other reactants, the heat of reaction raises the sensible heat to such a degree that an actual rise of temperature of 50° or more may be realized in the reactor over the temperature acquired in the exchanger.

The more heat exchanger surface effectively employed, the more complete will be the heat conservation attained and the less heating from without will be necessary. In case the exothermic heat gain is in excess of the heat losses, control will be attained by regulating a heat loss from some suitable portion of the stream, i. e., before, in, or after the reaction zone. In case the exothermic heat gain is less than the heat losses, control will be attained by regulating a heat input to some suitable portion of the stream, most directly to the portion thereof just before entering the reaction zone, more safely and easily to that portion of the entering stream while at low temperature as before entering the exchange zone. A convenient place to set up and regulate a heat loss is just prior to the reaction zone as at the initial heater 5 by damper control of air circulation through said heater or otherwise in contact with the hot interior of the system. A convenient place for low temperature heating control is in the portion of the stream before entering the heat exchanger as at 3 where low temperature head heating may be employed. In all cases regulation may be provided by hand controlled or automatic thermostatically operated control devices. Temperature control of the process is accordingly attained by setting up and regulating a heat exchange between the outside of the apparatus and some portion of the stream of the reaction mixture within the apparatus, whereby through addition of heat from without or abstraction of heat from within, the reaction temperature may be maintained within the desired range in opposition to the influence of varying operating conditions which tend to upset the thermal balance.

I have demonstrated the herein described improvement in large scale production and am able, after having once brought the system up to temperature to discontinue entirely the use of fuel heat depending solely upon the steam heater 3, or upon controlled heat loss, to maintain the heat content and temperature of the system against variations of losses by radiation and to the cooler and on account of other variations in operating conditions. The heater 3 may be controlled by well understood means, and using as heating agent therein steam or other vapor, oil, etc., may have a fixed maximum temperature, a high rate of heat transfer and cannot under any circumstances overheat the metal pipe coils or the contents thereof. The only opportunity for possible overheating of any of the metallic apparatus in the system is in the heater 5 which, if used for the brief period of initial heating only, reduces the risk of overheating to a negligible factor and for such short period of initial use ordinary care insures practical immunity from such risks. I have found further that, with the absence of overheating of the metal, corrosion of the fuel fired heater is reduced, the length of runs is increased, troubles with stoppage of the cooler are reduced, the cost of fuel is almost entirely eliminated, and the system is placed under conditions of much more even and easy temperature and operating control. With the absence of fuel heating in 5, variations in the rate of pumping, or even temporary shutdowns, will not introduce the risk of raising the temperature of the apparatus or reactant in any part of the system to a dangerous undesirable degree, since there is no high temperature source of heat in the system after the initial use of fuel has ceased.

I find further when employing my method that temperature operating conditions may be far more closely controlled with greatly reduced effort and expense for attendance than heretofore, and that, owing to such close control, the former requirement of excess alkali in the mixture is removed and the mixture may be prepared with the proportions of ingredients closely approximating the optimum. Owing to absence of excessive heating at any time the character and amount of tars formed is favorably affected. Because of even conditions, the chlorobenzene ingredient of the mixture may be substantially entirely hydrolyzed uniformly at high efficiency. These and other accompanying improved conditions react very favorably upon cost of product and uniformity thereof.

Instead of employing fuel in the heater 5, a high boiling liquid heating agent, such as an oil or diphenyl oxide, etc., may be there employed which, if its temperature be controlled, will mitigate risk of overheating at that point. Such heating agent may also be employed in place of steam in the heater 3.

The cooler 7 may, of course, be omitted provided either it be found undesirable or unnecessary further to reduce the temperature of the discharged fluid, or sufficient reduction thereof has been attained in the exchanger 4.

In Figs. 2 to 4, inclusive, I show a number of alternative arrangements of connected heating, exchanger, and reactor elements, omitting for the sake of simplicity the mixer, pump, final cooler, and receiver. In Fig. 2 the reactor and exchanger are combined and the incoming stream is subjected to high temperature initial heating until the system is up to operating temperature and thereafter to low temperature control heating. I have tested this arrangement, but prefer that shown in Fig. 1 in which, by the provision of an unheated insulated reactor, time is given for the reaction, when once the mixture has attained reaction temperature, undisturbed by heat changes due to the action of the exchanger.

In Fig. 3 the preheater step is dispensed with and a high temperature heating step is included on the incoming stream between the exchanger and the reactor in which high temperature initial heating to start up the system will be followed by heating at reduced temperature for the purpose of process control. Although feasible, this plan has the disadvantage of continuing a certain amount of external heating throughout the run. A similar arrangement is shown in Fig. 4 in which the exchanger is more liberally proportioned than in Fig. 3. With this arrangement, initial heating at high temperature may be followed by controlled heating of like kind or by controlled cooling when heat of reaction exceeds losses, the latter practice being preferable since high temperature heating is thereby dispensed with except in the initial stages.

It is apparent that other modifications than herein described may be made, but for conducting the hydrolytic type of reaction for the production of phenols where a considerable heat of reaction is developed, the arrangements shown in Figs. 1–4 will be found convenient and a marked improvement over the prior art.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:—

1. In the manufacture of phenol by reacting monochlorobenzene with an aqueous sodium hydroxide solution at an elevated temperature and corresponding pressure, the method which comprises mechanically mixing said chlorobenzene and said solution, continuously introducing the mixture under pressure into a tubular reaction system insulated against heat loss, initially preheating by exchange of heat with a heat transfer medium at a temperature materially below the subsequent reaction temperature, thence passing through a heat exchange zone in countercurrent relation with outgoing reacted material, whereby to preheat the mixture to approximately reaction temperature, causing the preheated mixture to traverse a reaction zone wherein the temperature is maintained above 350° C. but not greatly exceeding 400° C. by regulating the balance between low temperature heat input and heat loss in said preheating steps, passing the hot reacted mixture in countercurrent heat transfer relation with incoming material from said initial preheating step and finally discharging the thereby partially cooled reaction product with release of pressure.

2. In the manufacture of phenol by heating monochlorobenzene with an aqueous sodium hydroxide solution under pressure at an elevated temperature, the steps which consist in preheating the mixed reaction materials to a temperature between about 350° and about 400° C. by exchange of heat with the hot product of the reaction and then allowing the reaction to proceed to completion in a heat insulated zone, whereby an approximate thermal balance of the process is provided.

3. In the manufacture of phenol by heating monochlorobenzene with an aqueous sodium hydroxide solution under pressure at an elevated temperature in an extended tubular reactor, the steps which consist in initially preheating the mixed reaction materials by addition of heat from an external source at a lower temperature than that of the reaction, then further preheating to a reaction temperature between about 350° and 400° C. by exchange of heat with the hot product of the reaction and allowing the reaction to proceed to completion in a heat insulated reaction zone, whereby an approximate thermal balance of the process is provided.

4. In the manufacture of phenol by heating monochlorobenzene with an aqueous sodium hydroxide solution under pressure at an elevated temperature in an extended tubular reactor, the steps which consist in initially preheating the mixed reaction materials by addition of heat from an external source at a lower temperature than that of the reaction, then further preheating to a reaction temperature between about 350° and about 400° C. by exchange of heat with the hot product of the reaction, allowing the reaction to proceed to completion in a heat insulated reaction zone, whereby an approximate thermal balance of the process is provided, and preventing excessive rise of reaction temperature by controlled heat loss from a portion of the tubular system.

5. In the manufacture of phenol by heating monochlorobenzene with an aqueous sodium hydroxide solution under pressure at an elevated temperature in an extended tubular reactor, the steps which consist in initially preheating the mixed reaction materials by addition of heat from an external source at a lower temperature than that of the reaction, then further preheating to approximately reaction temperature by exchange of heat with the outgoing hot product of the reaction, causing the preheated mixture to traverse a reaction zone insulated against loss of heat, wherein the temperature is maintained above 350° C. but not greatly exceeding 400° C., and discharging the reacted mixture in heat exchange relation with the incoming material in the said second preheating step.

6. In the manufacture of phenol by heating monochlorobenzene with an aqueous sodium hydroxide solution under pressure at an elevated temperature in an extended tubular reactor, the steps which consist in initially preheating the mixed reaction materials by addition of heat from an external source at a lower temperature than that of the reaction, then further preheating to approximately reaction temperature by exchange of heat with the outgoing hot product of the reaction, causing the preheated mixture to traverse a reaction zone insulated against loss of heat, wherein the temperature of the mixture is maintained above about 350° C. by the heat of reaction evolved, preventing the temperature in said zone from rising materially above 400° C. by controlled heat loss from a portion of the reaction system, and discharging the reacted mixture in heat exchange relation with the incoming material in the said second preheating step.

MARK E. PUTNAM.